(12) United States Patent
Vergoossen

(10) Patent No.: US 9,027,073 B2
(45) Date of Patent: May 5, 2015

(54) TRANSMISSION OF PRE-SET CHANNEL ALLOCATION INFORMATION

(75) Inventor: Theodorus Anna Petrus Gertrudis Vergoossen, Eindhoven (NL)

(73) Assignee: TP Vision Holding B.V., Eindhoven (NL)

( * ) Notice: Subject to any disclaimer, the term of this patent is extended or adjusted under 35 U.S.C. 154(b) by 992 days.

(21) Appl. No.: 12/067,949

(22) PCT Filed: Sep. 14, 2006

(86) PCT No.: PCT/IB2006/053275
§ 371 (c)(1),
(2), (4) Date: Mar. 25, 2008

(87) PCT Pub. No.: WO2007/034381
PCT Pub. Date: Mar. 29, 2007

(65) Prior Publication Data
US 2008/0216133 A1 Sep. 4, 2008

(30) Foreign Application Priority Data
Sep. 26, 2005 (EP) ..................................... 05108847

(51) Int. Cl.
*H04N 7/16* (2011.01)
*H04N 21/2385* (2011.01)
*H04N 21/231* (2011.01)
*H04N 21/438* (2011.01)
*H04N 21/482* (2011.01)

(52) U.S. Cl.
CPC ..... *H04N 21/2385* (2013.01); *H04N 21/23109* (2013.01); *H04N 21/4383* (2013.01); *H04N 21/4828* (2013.01)

(58) Field of Classification Search
CPC .................... H04N 21/23109; H04N 21/4383; H04N 21/4828
See application file for complete search history.

(56) References Cited

U.S. PATENT DOCUMENTS

| | | | |
|---|---|---|---|
| 5,926,207 A * | 7/1999 | Vaughan et al. ............... | 725/139 |
| 6,122,011 A * | 9/2000 | Dias et al. ...................... | 348/569 |
| 6,510,556 B1 * | 1/2003 | Kusaba et al. .................. | 725/93 |
| 6,583,825 B1 | 6/2003 | Yuen et al. | |
| 6,594,826 B1 * | 7/2003 | Rao et al. ......................... | 725/95 |
| 6,744,477 B2 | 6/2004 | Meersseman | |
| 6,774,926 B1 * | 8/2004 | Ellis et al. .................. | 348/14.01 |
| 8,171,515 B2 * | 5/2012 | Schwesinger et al. .......... | 725/46 |
| 2003/0110498 A1 | 6/2003 | Stone | |
| 2003/0126600 A1 * | 7/2003 | Heuvelman ..................... | 725/35 |
| 2003/0213001 A1 * | 11/2003 | Yuen et al. ..................... | 725/136 |
| 2004/0187161 A1 * | 9/2004 | Cao ................................ | 725/110 |
| 2005/0114879 A1 * | 5/2005 | Kamieniecki ................... | 725/15 |
| 2006/0053446 A1 * | 3/2006 | Kim et al. ....................... | 725/39 |
| 2009/0037958 A1 * | 2/2009 | Traw et al. ...................... | 725/46 |

FOREIGN PATENT DOCUMENTS

| DE | 3827204 | 5/1989 |
|---|---|---|
| DE | 3815071 | 11/1989 |

(Continued)

*Primary Examiner* — Rong Le
(74) *Attorney, Agent, or Firm* — Shimokaji IP

(57) ABSTRACT

The present application provides transferring channel allocation tables for receiving radio frequency services. Automatic updating channel allocation tables is provided by storing within at least one central database at least one channel allocation table, storing within each of a plurality of distributed consumer electronic devices at channel allocation table for receiving the radio frequency services, and transferring the channel allocation tables between the central database, and the distributed consumer electronic device via a bidirectional communication link.

13 Claims, 3 Drawing Sheets

(56) References Cited

FOREIGN PATENT DOCUMENTS

| | | |
|---|---|---|
| DE | 69413616 | 1/1995 |
| EP | 0624980 B1 | 11/1994 |
| JP | 10257402 A | 9/1998 |
| JP | 2004503961 A | 2/2004 |
| WO | 0024195 A1 | 4/2000 |
| WO | 0197513 A2 | 12/2001 |
| WO | 03077556 A1 | 9/2003 |
| WO | 2004095220 A2 | 11/2004 |

* cited by examiner

TRANSMISSION OF PRE-SET CHANNEL ALLOCATION INFORMATION

TECHNICAL FIELD

The present patent application relates in general to transferring channel allocation tables for receiving radio frequency services between a central database and distributed consumer electronic devices.

BACKGROUND

Consumer electronic devices, such as television receivers, video cassette recorders (VCR), optical disc recorders (etc., DVD, MOD, CD, Blue Ray), satellite receivers radio receivers, set-top boxes, TV-PC cards, whether digital or analogue, can be tuned to a desired program by means of a pre-set program number. Within the receivers, a tuner is provided, which comprises a memory. Within this memory, tuning data for each pre-set program in the form of the transmitter frequency or channel number of the program is assigned to a program number. By means of this transmitter frequency or channel number, the receiver can be tuned to the corresponding transmission channel, and can receive the desired program.

For receiving radio frequency services, such as television programs, radio programs, multi-media programs, and the like, the receivers have to be tuned to the correct radio frequency or channel.

Nowadays, a plurality of radio frequency services is available within the frequency band. For instance, in the field of television broadcasting, radio-frequency spectrum allocations are used in the radio frequencies as referred to as Very-High-Frequency (VHF), and Ultra-High-Frequency (UHF). Each television broadcast station, or other radio frequency service, occupies one channel in the radio frequency spectrum. These channel allocations however, may vary depending upon the particular service, i.e., satellite transmission, cable service, and over-the-air broadcasts. Further, the channel allocations may vary depending upon the specific geographic area of service.

In order to be able to receive the plurality of radio frequency services on a consumer electronic device, the user has to tune the memory during installation. During this step, different radio frequencies or channels are assigned to program numbers. This assignment of radio frequencies to program numbers can be understood as channel allocation table or preset list. Within the channel allocation table, all information for receiving different programs on different channels is provided. This manual installation procedure is cumbersome and annoying to users.

One example of a known installation procedure is manual installation, where the user has to set up each pre-set channel at a time by hand. Another example is band scanning, which is done automatically, and followed by an automatic search activity for searching radio channels which transmit programs. Yet, another example is Automatic Channel Installation (ACI), which uses information provided by the network provider within the radio signal, for instance, in the teletext pages. The known mechanisms require either a lot of effort from users for doing the installation, or at the network provider side for updating the ACI teletext pages. Further, the channel allocation table can change during time, in particular, when the assignment of different programs to different channels is changed on the network operator side. Further, there are regional differences between the channel allocations. For example, within one same network operator, different channel allocations are applied in different regions. Also, when different network operators provide radio frequency services in different areas, the channel allocations may differ from network operator to network operator.

It is therefore an object of the application to provide easy installation of channel allocation tables in consumer electronic devices. It is further an object of the application to enable user driven updates of channel allocation tables. Further, it is an object of the present application to provide a region-specific tool for channel allocation tables.

SUMMARY OF THE INVENTION

These and further objects of the application are solved by a method for transferring channel allocation tables for receiving radio frequency services with storing within at least one central database at least one channel allocation table, and storing within at least two distributed consumer electronic devices a channel allocation table for receiving the radio frequency services, wherein the channel allocation tables are transferred between the central database and the distributed consumer electronic devices via a bidirectional communication link.

A channel allocation table may be understood as a look-up-table for providing radio frequencies assigned to certain program numbers. A channel allocation table may further comprise a plurality of stored radio frequencies, each of these representing a particular radio frequency service station. Radio frequency service stations may be broadcasting stations, which provide multi-media content using radio frequencies. Radio frequency services may, for instance, be radio services, television services, and other multi-media services, which are broadcast by broadcasting stations. Consumer electronic devices, such as, for example, radios, televisions, VCR, optical disc recorders, set-top-boxes, etc. enable programming certain channels to certain program numbers. Users can select the program numbers and view the radio frequency service assigned to the radio channel stored for this program number.

A central database may, for example, be any kind of back end server providing access for distributed consumer electronic devices through an interface. The central database may comprise a processor, memory, and interfaces. A central database, according to the present application may be connected to the internet for bidirectional communication with the consumer electronic devices using any communication means, i.e. LAN, WAN, cellular radio services, Wireless LAN, etc, and any communication protocol, i.e. internet protocol.

According to one aspect of the application, channel allocation tables, which are configured by users or at the database side can be transferred between the central database, and the distributed consumer electronic devices via a bidirectional communication link.

Initially, the central database may be filled with information available from network operators. Eventually, during operation, the database can be updated with channel allocation tables retrieved from connected consumer electronic devices. The consumer electronic devices can provide access to a download portal at the central database for downloading pre-set channel allocation tables. Via this download portal, users of consumer electronic devices can select pre-defined lists of channel allocation tables. It may be possible that users can use search facilities within the download portal in order to enable faster finding the most suitable channel allocation table. Whenever a customer has selected the desired channel allocation table, this can be downloaded like any other application onto the consumer electronic device. After downloading, the local channel allocation table may be updated by the downloaded channel allocation table. Besides this downloading process, the current application enables also uploading channel allocation tables edited by users. Whenever a consumer electronic device connects with the central database, manually composed channel allocation lists provided by users may be uploaded onto the central database. The user may initiate this upload process manually, or it may be triggered automatically.

According to one embodiment, transferring the channel allocation table via the bidirectional communication link comprises forwarding a channel allocation table from the consumer electronic device to the central database. Further, it may be possible to receive within the consumer electronic device a channel allocation table from the central database. In addition, it may be possible to forward a channel allocation table from the central database to the consumer electronic device. Eventually, for transferring the channel allocation table, it may be possible to receive within the central database a channel allocation table from the consumer electronic device.

In order to enable region-specific settings of channel allocation tables, region information can be assigned to the channel allocation tables according to embodiments. The region information can be entered manually by the user via entering this data via a form into the consumer electronic device, but it may also be possible to use more advanced techniques, like using the network topology, and further network information. This region information can be used to assign uploaded channel allocation tables to particular regions. Further, by providing the region identifier, users can select channel allocation tables suitable for their current regions for downloading.

According to embodiments, it is possible to transfer a region identifier between the central database, and the consumer electronic device, and to transfer the channel allocation table assigned to the corresponding region identifier. According to this embodiment, it may be possible that the region identifier is provided by the user and that the central database forwards the corresponding channel allocation table to the consumer electronic device. Further, it may be possible that during uploading the channel allocation table from the consumer electronic device to the central database the region identifier is also provided. This enables the central database to store the uploaded channel allocation table for the corresponding region.

The more channel allocation tables are available, the more different regions will be covered with channel allocation tables. Therefore, embodiments provide increasing region granularity with increasing number of channel allocation tables stored on the central database with different region identifiers. The more channel allocation tables with different region identifiers are available, the higher the granularity may be.

When uploading channel allocation tables from consumer electronic devices to the central database, the channel allocation tables stored on the central database can be updated according to embodiments. The uploaded channel allocation table can be directed to an update application within the central database which checks the new data. This application may also check, if the information available in the uploaded channel allocation table is newer than the already stored channel allocation table, and allows only updating the database if required.

According to embodiments, updating channel allocation tables stored on the central database may comprise automatically retrieving channel allocation tables from consumer electronic devices, when connecting to the central database. For example, each time the consumer electronic device connects to the central database, an application within the central database or within the consumer electronic device may provide the channel allocation tables stored on the consumer electronic device to the central database. It is also possible to scan the consumer electronic devices in communication with the central database for channel allocation tables. This enables the central database to automatically scan within the consumer electronic device, whether channel allocation tables are available, which can be used for updating the central database.

Also, uploading channel allocation tables from the consumer electronic device to the central database upon user request is possible. Users can select their channel allocation tables to be uploaded to the central database, and uploading may happen as soon as the consumer electronic device connects to the central database or the user permits uploading.

An automatic update mechanism may also include an update agent. Whenever a consumer electronic device connects to the central database, the update agent may become active. The update agent may automatically check the channel allocation tables stored on the consumer electronic device, and may forward found channel allocation tables to the central database.

To provide an added-value to the user, it may also be possible to enable users to update their present channel allocation table using the channel allocation tables stored on the central database. Insofar, embodiments provide updating a channel allocation table stored in the consumer electronic device with a channel allocation table from the central database.

According to embodiments, updating the channel allocation tables stored on the consumer electronic device may comprise automatically retrieving channel allocation tables from the central database when connecting to the central database. For example, each time the consumer electronic device connects to the central database, it is checked whether newer channel allocation tables are available on the central database, and these can be retrieved automatically to update the channel allocation table on the consumer electronic device.

It may also be possible to scan the central database in communication with the consumer electronic device for channel allocation tables.

Further, according to embodiments, downloading channel allocation tables from the central database to the consumer electronic device upon user request is possible. According to this embodiment it is possible to provide a download portal on the central database. Using this download portal, users may select particular channel allocation tables, and initiate downloading these onto their consumer electronic device.

According to embodiments, an update agent may be executed. This update agent may automatically check channel allocation tables stored on the central database, and may forward found channel allocation tables to the consumer electronic device. The update agent does not necessarily need an active communication link, but may also be executed within the central database, and may connect with the consumer electronic device once a new channel allocation table has been found. It may also be possible to send an electronic message to the consumer electronic device, for example, an email, in case the new channel allocation table has been detected. The user may then decide to connect to the central database for downloading the newer channel allocation table, or an automated download may commence.

According to embodiments, the download portal may be provided by a user interface of the central database. Users are enabled to select channel allocation tables for updating the consumer electronic device via the user interface.

In order to allow checking, whether a channel allocation table is of a newer version, embodiments provide assigning an update identifier to a channel allocation tables stored on the central database and/or the consumer electronic device. This update identifier may, for example, be timestamp information. Other flags for indicating an update status may also be possible. Based on this update information, it is possible to detect that a particular consumer electronic device can provide a modified channel allocation table. This new channel allocation table may then be uploaded to the central database, and submitted to an update application. The update application can check, whether the received channel allocation table is newer than the available channel allocation tables for particular regions and may then update the database if required. In this event, it may also be possible that an event mechanism gives a user a notification that a more recent channel allocation table is available. To compare channel allocation tables stored on the central database with channel allocation tables stored on consumer electronic devices, the channel allocation tables on the consumer electronic devices need also an assigned update identifier.

In order to check whether an update is necessary, embodiments provide comparing the update identifier of the stored channel allocation table with an update identifier of a received channel allocation table to be used for updating. On each side, either on the central database side or on the consumer electronic device, received channel allocation tables can be checked for their update identifier. It can be determined, whether the update identifier of the received channel allocation is newer than the update identifier of the already stored channel allocation table. If the received channel allocation table is newer, it can be used for updating. Otherwise it can be discarded. It can also be possible to request the users to decide, whether the received channel allocation table should be used for updating.

Embodiments also comprise a feedback channel for feeding back user evaluation results enabling new users and system operators to judge the quality of the available channel allocation tables.

Another aspect of the application is a consumer electronic device comprising a tuner for receiving radio frequency services on a plurality of radio channels, a memory for storing a channel allocation table, and a bidirectional interface for transferring the channel allocation table stored in the memory to and from a central database bidirectionally.

A further aspect of the application is a central database station comprising a memory for storing a plurality of channel allocation tables, and a bidirectional interface for transferring the channel allocation tables stored in the memory to and from distributed consumer electronic devices bidirectionally.

Yet, another aspect of the application is a system comprising at least one central database station, a plurality of consumer electronic devices, and a communication network for bidirectional communication between the central database, and the consumer electronic devices.

These and other aspects of the application will be elucidated with and become apparent from the following Figures.

BRIEF DESCRIPTION OF THE FIGURES

In the figures show.

DETAILED DESCRIPTION OF THE DRAWINGS

Known methods for updating channel allocation tables on consumer electronic devices require either a lot of effort from the customer or from the network provider. The customer needs to search and sort the channels, needs to name them, needs to remove wrong hits, needs to adjust the frequency, etc. The network provider needs to update the ACI teletext pages. These methods are cumbersome, and error prone. Further, these methods are not flexible in view of changing channel allocations.

The application provides a method, which provides a growing database of pre-set channel allocation tables that may be available at one central database. Consumer electronic devices can connect to the central database. The database can contain per region an actual pre-set channel allocation table that can be downloaded by the consumer electronic devices. The database may initially be filled by information as provided by a network operator, but can be updated by information from the users retrieved from the consumer electronic devices, which connect to the central database. Retrieval of updated channel allocation tables can be done automatically, by scanning the data when the user connects its consumer electronic device to the central database, or manual by having an entry in the user interface, where the user can submit his actual channel allocation table to the central database. The central database can scan the retrieved data, and check, whether updating its data is necessary. With region information, granularity of the data may increase over time, as more data becomes available.

Figure 1:
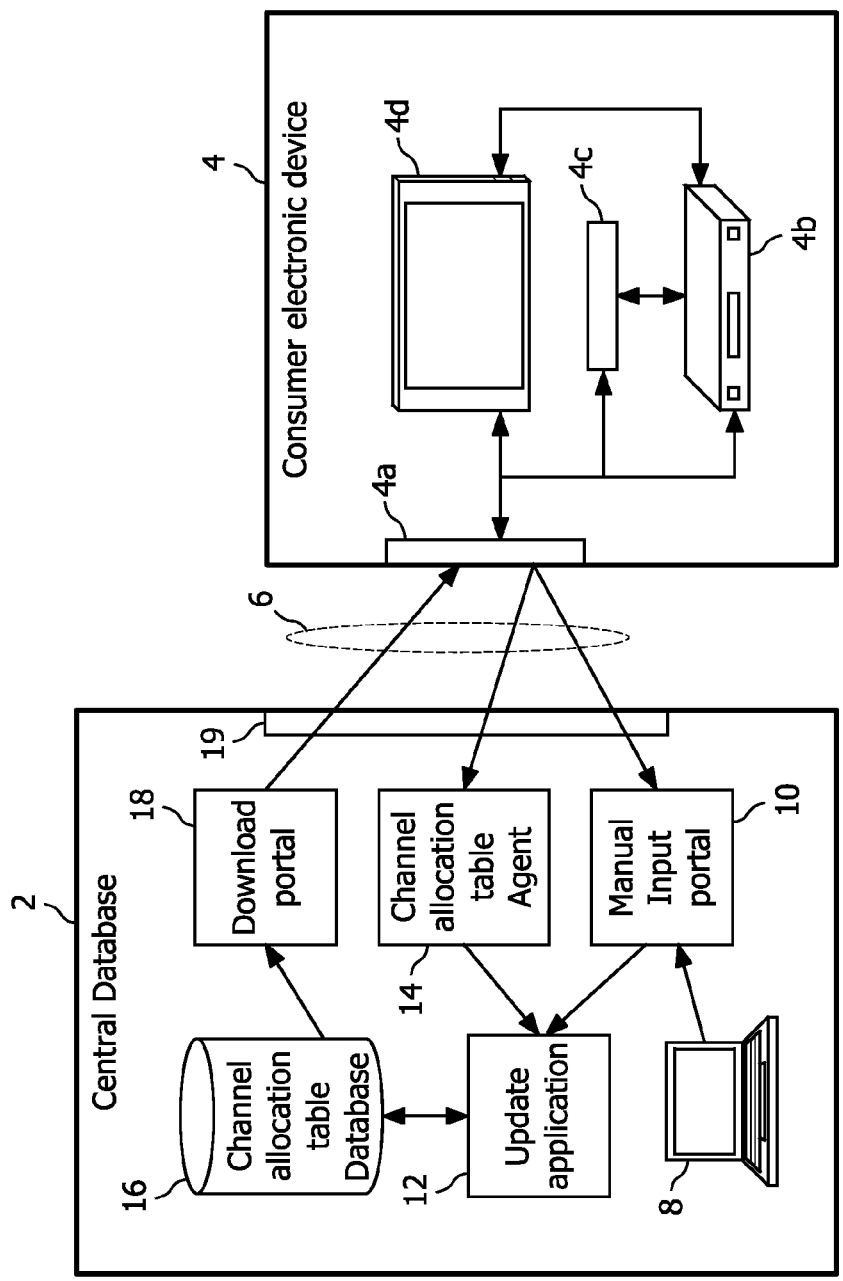
FIG. 1 an illustration of a system arranged for providing bidirectional transferring channel allocation tables.

FIG. 1 illustrates a system for providing such a method. Illustrated are a central database, or back-end server, 2 and a consumer electronic device 4, which are connected via a bidirectional communication network 6, for instance the internet, or a wireless communication network such as W-LAN, GSM or UMTS. More consumer electronic devices than depicted may be part of the system. The consumer electronic devices can be located at various different geographic locations.

The central database 2 comprises a user interface 8, a manual input portal 10, an update application 12, a channel allocation table agent 14, a channel allocation table database 16, as memory, a download portal 18, and a bidirectional interface 19 for connecting to the communication network 6 and for transferring channel allocation tables stored in the channel allocation table database 2 to and from consumer electronic device 4.

The manual input portal 10 can be used at the central database 12 to add information to the channel allocation table database 16 without involvement of the customer. The channel allocation table database 16 comprises the channel allocation tables for each region, together with the respective timestamps. A one time initialization at the beginning can be done manually. By using the user interface 8, it is possible to enter initial data or update data into the channel allocation table database 16, manually, at the central database 2 side for a first time initialization. Information entered via this method can, for example, be based on data received from network providers or obtained via market research. Other methods to initialize this data can be used. The manual entry using user interface 8 enables to initialize central database 2. The data input during initialization can then be used for initializing any number of consumer devices.

Channel allocation tables input through a manual input portal 10 are provided to update application 12. It is checked, whether for the corresponding region a channel allocation table is already available in the channel allocation table database 16, and in case not, or in case an outdated channel allocation table is available, channel allocation table database 16 is updated with the manually entered information. By this, for different regions, different channel allocation tables may be entered through user interface 8 to initialize central database 2.

The consumer electronic device, or customer premise, 4 is provided with an bidirectional interface 4a for connecting to the communication network 6, and thus for connecting to the central database 2. Further, consumer electronic device 4 comprises a tuner 4b for receiving radio frequency services on a plurality of radio channels, a memory 4c for storing channel allocation tables, and an output device 4d, such as a display. The bidirectional interface 4a enables the consumer electronic device to transfer channel allocation tables stored in the memory 4c to and from the central database 2.

The user can connect its consumer electronic device 4 through communication network 6 to download portal 18. Download portal 18 informs the user about information of available channel allocation tables. This information may be sorted per region. The download portal 18 can be equipped with search facilities in order to direct the user faster to the channel allocation table that is most suitable for him. Whenever the user has selected his desired channel allocation table, this can be downloaded onto the consumer electronic device 4 from the channel allocation table database 16 through download portal 18, and communication network 6. After downloading, the consumer electronic device 4 can be updated or initialized with the channel allocation table.

It may happen that users adjust their pre-set list, e.g., change the channel allocation tables. It might be desired that the channel allocation table database 16 is updated with the new channel allocation table as provided by the user. This can be done manually by accessing the manual input portal 10. It may also be possible that, after changing the local channel allocation table on consumer electronic device 4, consumer electronic device 4 connects automatically to channel allocation table agent 14. Channel allocation table agent 14 retrieves the altered channel allocation table from the consumer electronic device 4, and provides this to the update application 12. Within update application 12 the timestamp, and region of the provided channel allocation table is checked. In case an outdated channel allocation table for the particular region is stored the in channel allocation table database 16, the received channel allocation table is used for updating database 16.

Figure 2:
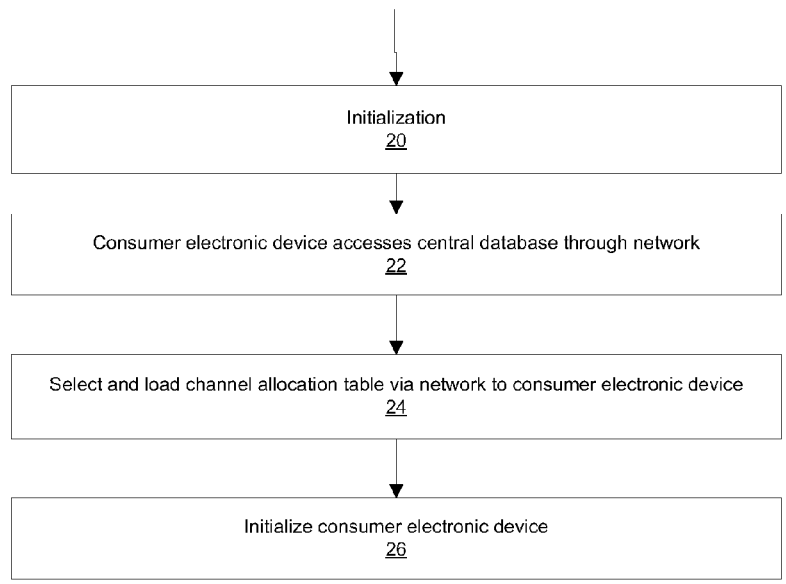
FIG. 2 a flowchart illustrating initializing the central database.

FIG. 2 illustrates an initialization of consumer electronic devices 4. At first, through user interface 8, manual input portal 10, and update application 12, channel allocation table database 16 is initialized (20). This initialization (20) can be done for various regions, inputting different channel allocation tables for different regions.

After the initialization (20), a consumer electronic device 4 may access (22) the central database 2 through network 6. This access (22) may either be to download portal 18, channel allocation table agent 14, or manual input portal 10. For initializing the consumer electronic device 4, access to the download portal 18 is preferred. Users can select from download portal 18 channel allocation tables suitable for their needs. After selection of a channel allocation table, this channel allocation table is loaded (24) from channel allocation table database 16 via communication network 6 to consumer electronic device 4. With the downloaded channel allocation table, consumer electronic device 4 may be initialized (26).

Figure 3:
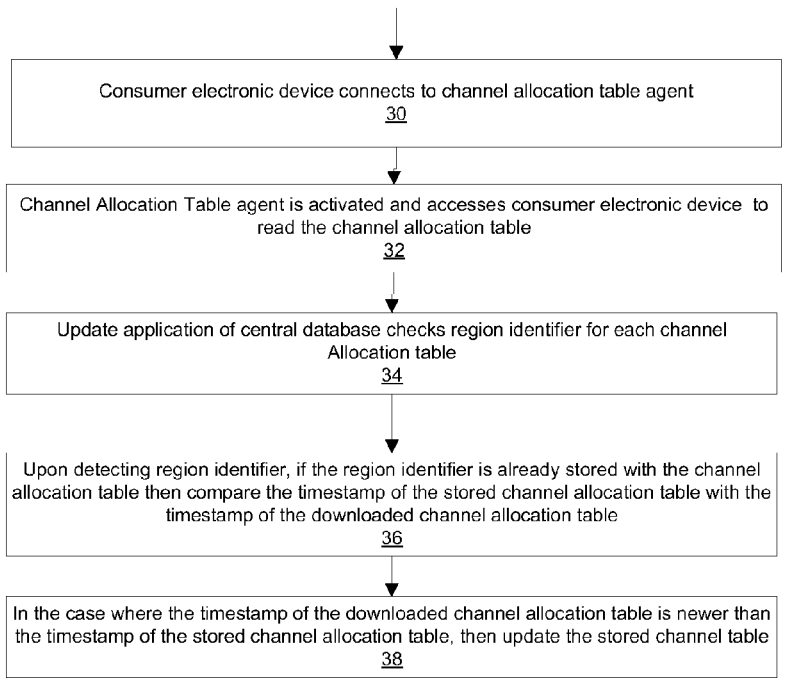
FIG. 3 a flowchart illustrating updating the channel allocation table on the central database.

Besides the initialization of consumer electronic device 4, the bidirectional transfer of channel allocation tables between central database 2 and consumer electronic device 4 provides updating central database 2, as illustrated in FIG. 3. It may happen that during use of consumer electronic device 4 users alter and manipulate the channel allocation table stored on their consumer electronic devices 4. When the consumer electronic device 4 connects to the central database 2, which may happen automatically, upon user request, or event driven, e.g. when the channel allocation table is changed, the consumer electronic device 4 connects (30) to channel allocation table agent 14. Channel allocation table agent 14 is activated, and accesses consumer electronic device 4 to read the channel allocation table (32). All available channel allocation tables are obtained through channel allocation table agent 14, and provided to update application 12. Within update application 12, for each channel allocation table, the region identifier is checked (34). Once a region identifier has been detected, it is checked whether for this region within channel allocation table database 16 a channel allocation table is already stored. If not, the channel allocation table is directly stored in channel allocation table database 16. If yes, the timestamp of the channel allocation table stored in channel allocation table database 16 is compared (36) with the timestamp of the channel allocation table downloaded from consumer electronic device 4. In case the timestamp of the downloaded channel allocation table is newer than the timestamp of the already stored channel allocation table, channel allocation table database 16 is updated (38) with the new channel allocation table.

It may also be possible, to store all channel allocation tables uploaded from the consumer electronic device 4, and to compare, which channels are associated with which programs in the channel allocation tables of the uploaded channel allocation table, and to provide a ranking. This ranking may be such that for each channel there is provided a list, to which programs the channels are assigned. For instance, there are preferences to which programs channels are assigned. These preferences will become apparent from the ranking, e.g. the more often a channel is assigned to a particular program number, the higher the ranking of this combination. This ranking can be used to present users through download portal 18 preferred channel allocation tables.

Figure 4:
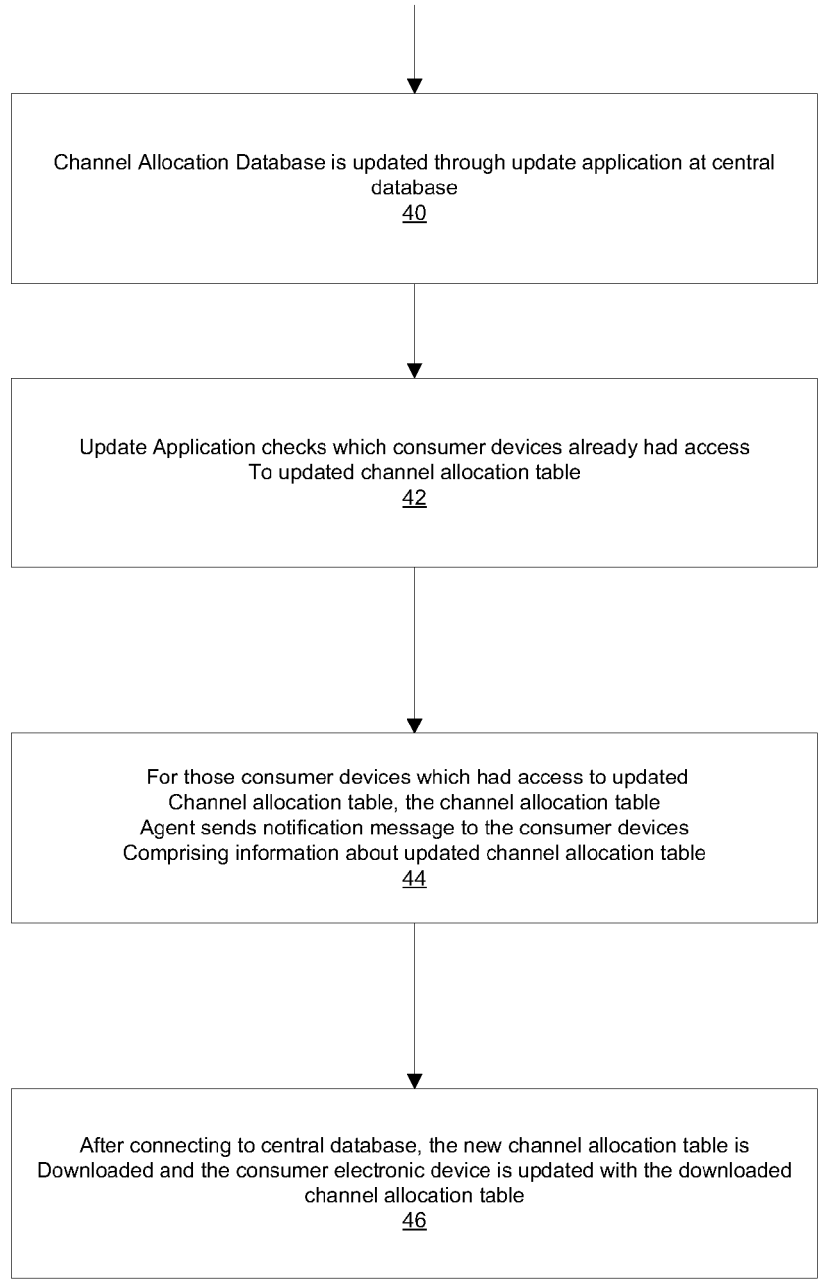
FIG. 4 a flowchart illustrating updating a channel allocation table on a consumer electronic device.

FIG. 4 illustrates updating the consumer electronic device 4 through an automatic update process. Through update application 12, channel allocation table database 16 is updated (40). The update application 12 checks, which consumer electronic devices 4 had already access to the updated channel allocation table (42).

For consumer electronic devices, which had access to the updated channel allocation table, channel allocation table agent 14 may send (44) a notification message to consumer electronic device 4. This notification message may comprise information about the channel allocation table, which has been updated. Upon reception of this update information, the consumer electronic device 4 may automatically connect to central database 2, or may request a user to initiate an update process. After connecting the central database 2, the new channel allocation table is downloaded (46), and the consumer electronic device 4 is updated with the downloaded channel allocation table.

The application provides updating channel allocation tables easily. Users can share interests, and have less frustration, when checking their channel allocation tables. The installation can be done in background, and updating the channel allocation tables can improve service quality. There is no need for initial equipment besides a consumer electronic device with a bidirectional interface, and a respective central database. Users can participate in providing updating channel allocation tables.

Alternatively the update application 12 can contain a filter function to check the validity of data received within the central database 16, and as such prevent for errors in the database 16. These errors may be caused due to errors in the communication channel 6 or errors caused by wrong information provided by the end user during installing the consumer electronics device 4.

A possible embodiment might be that users provide a feedback to the database 16. Such a feedback may be a backchannel, where users can comment on the channel allocation table received. The user comments and the user voting can be fed back to the database 16 providing a dynamic evaluation of the available channel allocation tables. This feedback channel can be used to create a ranking of channel allocation tables. Feedbacks from user can be positive or negative. Thus, a new user or the system operator is able to judge on the quality of the available channel allocation tables. For providing feedback, a feedback data structure comprising identification of the channel allocation table used, the geographic region of the user, the type of consumer electronic device, the rating of the user, etc., can be used.

The invention claimed is:

1. A method for transferring channel allocation tables for receiving radio frequency services, comprising:
storing within at least one central database at least one user configured channel allocation table provided by a first remote distributed consumer electronic device wherein the at least one user configured channel allocation table is transferred between the at least one central database and the first remote distributed consumer electronic device via a bidirectional communication link,
wherein the at least one user configured channel allocation table, provided by the first remote distributed consumer electronic device to the at least one central database, comprises a plurality of stored radio frequencies along with respective program numbers;
providing access to the at least one user configured channel allocation table stored in the at least one central database to a second remote distributed consumer electronic device; and
updating a channel allocation table stored on the second remote distributed consumer electronic device with the at least one user configured channel allocation table from the at least one central database.

2. The method of claim 1, wherein providing access to the at least one user configured channel allocation table via the bidirectional communication link comprises forwarding the at least one user configured channel allocation table from the at least one central database to the first or second remote distributed consumer electronic device.

3. The method of claim 1, further comprising assigning a region identifier with the at least one user configured channel allocation table.

4. The method of claim 3, further comprising transferring the region identifier between the at least one central database and the first remote distributed consumer electronic device and transferring the at least one user configured channel allocation table assigned to the corresponding region identifier.

5. The method of claim 3, further comprising increasing region granularity with increasing number of user configured channel allocation tables stored on the at least one central database with different region identifiers.

6. The method of claim 1, further comprising updating the at least one user configured channel allocation table stored on the at least one central database with other user configured channel allocation tables received from other distributed consumer electronic devices.

7. The method of claim 6, wherein updating the at least one user configured channel allocation table stored on the at least one central database comprises at least one of:
automatically retrieving the other user configured channel allocation tables from the other consumer electronic devices when connecting to the at least one central database;
scanning the other consumer electronic devices in communication with the at least one central database for the other user configured channel allocation tables;
uploading the other user configured channel allocation tables from the other consumer electronic devices to the at least one central database upon user request; and
executing an update agent that automatically checks the other user configured channel allocation tables stored on the other consumer electronic devices and forwards found other user configured channel allocation tables to the at least one central database.

8. The method of claim 1, wherein updating a channel allocation table stored on the second remote distributed consumer electronic device comprises at least one of:
automatically retrieving the at least one user configured channel allocation table from the at least one central database when connecting to the at least one central database;
scanning the at least one central database in communication with the second remote distributed consumer electronic device for the at least one user configured channel allocation table; and downloading the at least one user configured channel allocation table from the at least one central database to the second remote distributed consumer electronic device upon user request.

9. The method of claim 1, further comprising a user interface at the at least one central database enabling users to select from a plurality of user configured channel allocation tables.

10. The method of claim 1, further comprising assigning an update identifier to the at least one user configured channel allocation table stored on the at least one central database or the first remote distributed consumer electronic device.

11. A consumer electronic device comprising:
a tuner that receives radio frequency services on a plurality of radio channels,
a memory that stores a user configured channel allocation table configured to be downloadable by another consumer electronic device, and
a bidirectional interface that transfers the user configured channel allocation table stored in the memory to and from a central database,
wherein the user configured channel allocation table comprises a plurality of stored radio frequencies, wherein the user configured channel allocation table includes a program number corresponding to each stored radio frequency; and
updating a channel allocation table stored on a second consumer electronic device with the at least one user configured channel allocation table from the central database.

12. A central database station comprising:
a memory that stores a plurality of user configured channel allocation tables received from remote distributed consumer electronic devices, and
a bidirectional interface that transfers the user configured channel allocation tables stored in the memory to and from the remote distributed consumer electronic devices,
wherein the user configured channel allocation table includes one of a plurality of stored radio frequencies along with a respective radio frequency service station associated with each stored radio frequency or a plurality of radio frequencies along with a respective assigned program number; and
updating a channel allocation table stored on a second remote distributed consumer electronic device with the at least one user configured channel allocation table from the central database station.

13. A system comprising at least one central database station comprising:
a memory that stores a plurality of user configured channel allocation tables received from remote distributed consumer electronic devices, wherein the user configured channel allocation tables include a plurality of stored radio frequencies and a plurality of program numbers, wherein any given program number is associated with a respective stored radio frequency, and
a bidirectional interface that transfers the user configured channel allocation tables stored in the memory to and from the remote distributed consumer electronic devices via a bidirectional communication network; and
updating a channel allocation table stored on a second remote distributed consumer electronic device with the at least one user configured channel allocation table from the central database station.

* * * * *